United States Patent [19]
Baxter et al.

[11] Patent Number: 5,803,198
[45] Date of Patent: Sep. 8, 1998

[54] DOUBLE PIVOTING TRACTOR HOOD ASSEMBLY

[75] Inventors: Garry E. Baxter; Wayne M. Tiffany, both of Independence, Mo.

[73] Assignee: AGCO Engineering Group, Independence, Mo.

[21] Appl. No.: 608,114

[22] Filed: Feb. 28, 1996

[51] Int. Cl.$^6$ .................................................. B62D 25/10
[52] U.S. Cl. ........................ 180/69.21; 16/282; 16/366
[58] Field of Search ............................... 180/69.21, 69.2; 16/280, 282, 287, 288, 302, 366, 370

[56] References Cited

U.S. PATENT DOCUMENTS

| | | |
|---|---|---|
| D. 340,728 | 10/1993 | Martenas et al. . |
| D. 341,365 | 11/1993 | Little et al. . |
| 2,131,116 | 9/1938 | Northup .............................. 180/69.21 |
| 2,333,173 | 11/1943 | Gunning . |
| 3,711,892 | 1/1973 | Tabor . |
| 4,263,978 | 4/1981 | Jackson . |
| 4,359,119 | 11/1982 | Kammerman ........................ 180/69.21 |
| 4,382,312 | 5/1983 | Liggett et al. .................. 180/69.21 X |
| 4,779,845 | 10/1988 | Bartesch et al. . |
| 4,805,264 | 2/1989 | Benning et al. ................. 180/69.21 X |
| 5,136,752 | 8/1992 | Benning et al. ........................... 16/287 |
| 5,238,213 | 8/1993 | Pool . |
| 5,535,846 | 7/1996 | Kurtz, Jr. et al. .................... 180/69.21 |

FOREIGN PATENT DOCUMENTS

| | | | |
|---|---|---|---|
| 2581950 | 11/1986 | France ................................. 180/69.2 |
| 1428622 | 10/1988 | U.S.S.R. ............................. 180/69.21 |

*Primary Examiner*—Robert J. Oberleitner
*Assistant Examiner*—Pamela J. Lipka
*Attorney, Agent, or Firm*—Litman, McMahon & Brown, L.L.C.

[57] ABSTRACT

A double pivoting tractor hood assembly includes a tractor hood, hood latch, and a mounting bracket assembly which is attachable within a tractor engine compartment. The bracket assembly includes a movable plate with a hinge mounting surface and a bracket latch. The movable plate, and the hinge mounting surface, is pivotable between a lower, latched position and an upper, elevated position. A hinge is attached between the hinge mounting surface and a top rear edge of the tractor hood. The hood can thus be moved to a tilted position when the hood latch is released, and then to an elevated position once the bracket latch is released. A pair of gas springs bias the hood toward the tilted position, and then the hood is biased toward the elevated position from the tilted position to allow unencumbered access to all components within the engine compartment.

14 Claims, 3 Drawing Sheets

DOUBLE PIVOTING TRACTOR HOOD ASSEMBLY

FIELD OF THE INVENTION

The present invention relates to a double pivoting tractor hood assembly including a tractor hood for covering the engine compartment of an agricultural tractor. More particularly, the inventive hood assembly includes a mounting bracket assembly attached within the engine compartment with a hinge connecting the mounting bracket assembly to the hood such that the hood can be selectively unlatched from a front mounted hood latch and then pivoted backward to a conventional tilted position. Once the hood is in the tilted position, a rear mounted bracket latch can be released, causing the bracket mounted hinge to be raised along with the connected hood, thus raising the hood from the tilted position to an elevated, substantially horizontal position to allow maximum access to the engine compartment.

BACKGROUND OF THE INVENTION

Prior art tractor hoods for covering tractor engine compartments have generally taken two forms. Many such hoods are attached via a hinge between the rearmost point of the hood and the upper rear of the engine compartment. A front mounted hood latch latches the front of the tractor hood to the tractor frame in a closed position. When the front mounted hood latch is released, the hood is allowed to pivot backward about the rear hinge to a tilted position to allow access to the engine compartment. In some larger tractors, as the front latch is released, a flat coil spring or a gas spring raises the hood to the tilted position.

Other tractor hoods operate in a similar fashion, but are hingedly connected near the top front of the engine compartment and are latched near the rear of the engine compartment so that they tilt forward once the rear mounted latch is released.

Both rear hinged and front hinged hoods have proven to be generally satisfactory in the past. However, tractors have become ever more powerful and engine mounted attachments such as auxiliary PTO's, air conditioners, power steering, etc., have proliferated. This has meant that manufacturers must pack larger engines and more accessories in the same amount of engine compartment space. Eventually, in some instances, front or rear hinged tractor hoods have not permitted access to all of the equipment, i.e. the hinged end of the hood blocks access to some accessories. Thus, in some cases, the hood must be removed entirely for certain repairs or maintenance tasks. With larger tractors this can be a time consuming task.

It is clear then, that a need exists for an improved tractor hood assembly which allows occasional greater access to the engine and accessories within the tractor engine compartment without requiring removal of the hood. Such a hood assembly should preferably allow the hood to be virtually indistinguishable from ordinary front or rear hinged tractor hoods in appearance when latched in place on the tractor.

SUMMARY OF THE INVENTION

The present invention is directed to a double pivoting tractor hood assembly with a tractor hood designed for at least partially covering the engine compartment of a medium to large sized modern tractor. The inventive hood assembly includes a mounting bracket assembly which is attached within the engine compartment near the upper rear thereof. The bracket assembly includes a first, stationary plate which is pivotably connected to a second, movable plate via a first hinge such that the second plate can pivot upward relative to the first plate. The first plate is oriented generally horizontally and is fixedly secured within the engine compartment. A bracket latch includes a male latch member attached to a bottom side of the second plate and the first plate includes an aperture positioned to receive the male latch member. A mating female latch member is positioned beneath the first plate proximate the aperture and the male and female latch members cooperate to releasably latch the second plate in a generally horizontal position atop the first plate. A second hinge is attached between a hinge mounting surface on a rear edge of the second plate and a top rear edge of the tractor hood. A pair of elongate gas springs are pivotably attached between respective brackets within the engine compartment and an underneath side of the hood. A conventional front mounted hood latch selectively latches a lower front side of the hood to the tractor frame to latch the hood in a closed position. In operation, with the hood in the closed, latched position, the hood latch is released by an operator and the gas springs cause the hood to pivot backward about the second hinge on the bracket assembly to a tilted position. The hood in the tilted position allows access to the engine and a majority of components and accessories within the engine compartment. When accessories mounted near the top of the engine compartment must be reached, the bracket latch is then released and the gas springs cause the bracket assembly second plate to pivot upward relative to the first plate. This causes the connected top rear edge of the attached hood also to pivot upward such that the hood is placed in a substantially horizontal position with both ends substantially elevated above the engine compartment. In this elevated position, the hood allows unencumbered access to all components within the engine compartment. The hood can then be relatched to the closed position by reversing the process.

OBJECTS AND ADVANTAGES OF THE INVENTION

The principal objects of the present invention are: to provide an improved double pivoting tractor hood assembly; to provide such a tractor hood assembly with a tractor hood which is pivotably connected to selectively cover an engine compartment; to provide such a tractor hood assembly with a front mounted hood latch which, when released, allows the hood to be tilted rearward to a tilted position in a conventional fashion to provide ordinary access to the engine compartment; to provide such a tractor hood assembly with a mounting bracket assembly positioned within the engine compartment in which a movable plate is hingedly attached to a top rear edge of the tractor hood; to provide such a tractor hood assembly in which the bracket assembly movable plate includes a bracket latch for latching the movable plate in a lower, substantially horizontal position; to provide such a tractor hood assembly in which release of the bracket latch when the hood is in the tilted position allows the movable plate to pivot upward, carrying the attached hood rear edge with it, thus causing the tractor hood to be elevated to a substantially horizontal position well above the engine compartment; to provide such a tractor hood assembly with gas springs which automatically cause the hood to tilt when the hood latch is released and then to rise to the elevated position once the bracket latch is released; to provide such a tractor hood assembly which allows maximum access to the engine and engine accessories in a tractor engine compartment without requiring removal of the tractor hood; and to provide such a tractor hood assembly which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DERAILED DESCRIPTION OF THE INVENTION

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
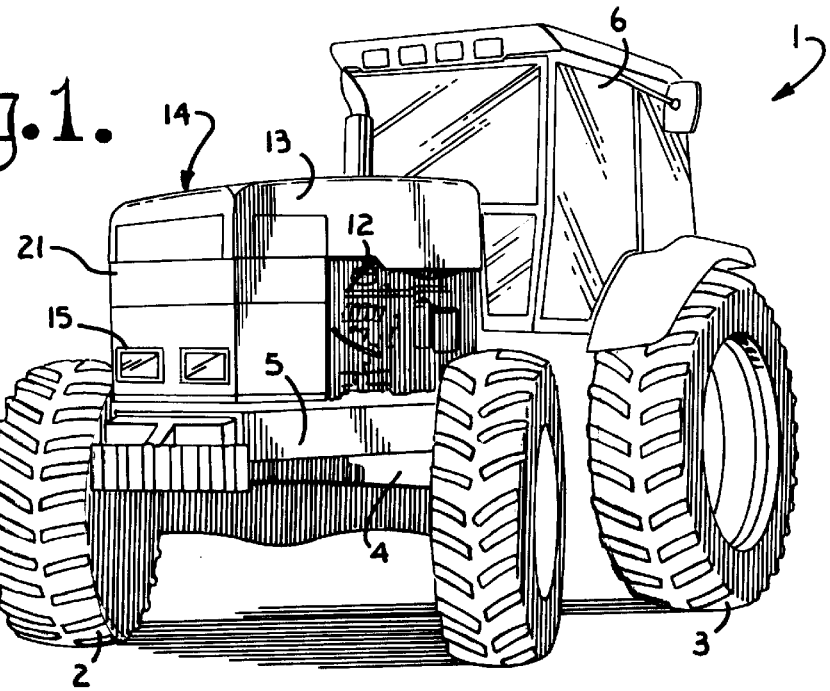
FIG. 1 is a perspective view of a tractor equipped with a double pivoting tractor hood assembly in accordance with the present invention.
Figure 2:
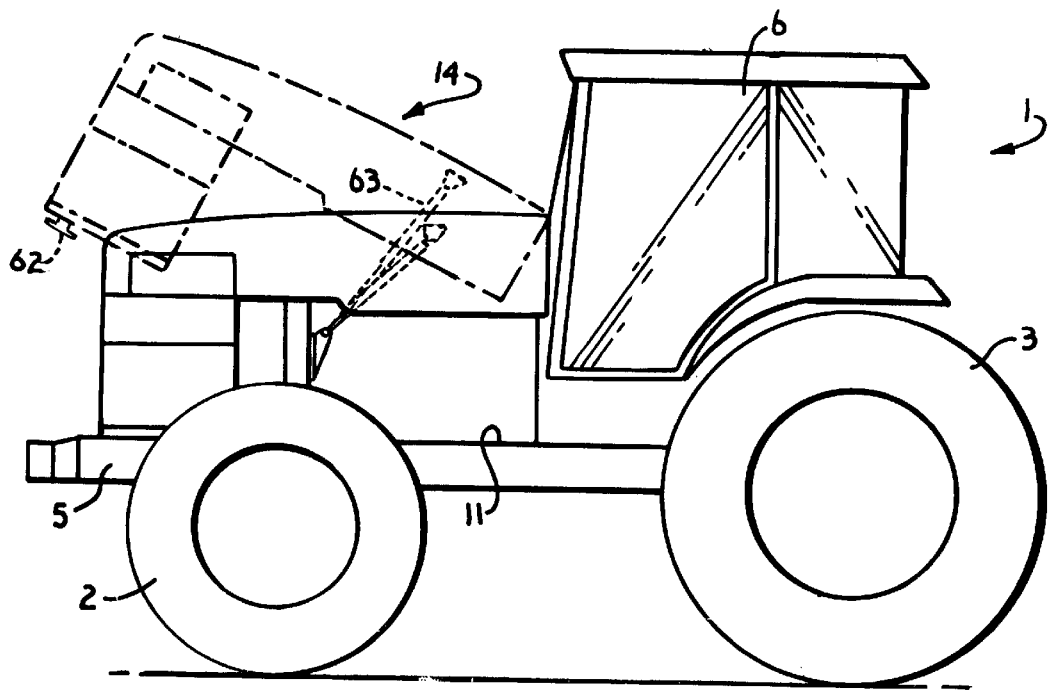
FIG. 2 is a partially schematic, side elevational view of the tractor of FIG. 1, with the tractor hood shown in solid lines in a closed position and in broken lines in a tilted position.

FIGS. 1 and 2 illustrate a mid-sized agricultural tractor, generally indicated at 1. The tractor 1 is conventional, with front and rear wheel pairs 2 and 3, respectively, mounted on axles 4 attached to a frame 5. An enclosed operator cab 6 sits atop the frame 5 and an engine compartment 11 is positioned forward of the cab 6.

The engine compartment 11 houses an internal combustion engine 12 and various conventional engine attachments and accessories. The engine 12 has a relatively high profile, with the engine 12 and accessories extending into a top, substantially horizontal section 13 of a tractor hood 14. The hood 14 includes a pair of headlamps 15 on a vertically oriented front section 21 thereof.

Referring to FIGS. 2–6, the double pivoting attachment of the hood 14 to the tractor 1 is illustrated in detail. A bracket assembly 22 is mounted within and near the rear of the engine compartment 11. The bracket assembly 22 includes a first plate 23 which is rigidly attached to the tractor frame 5 via an inverted U-shaped mounting base 24 and a pair of legs 25. The first plate 23 is preferably shaped as a tray with rigidizing short sidewalls 31 (FIG. 6) and the first plate 23 is oriented in a substantially horizontal position near the top rear of the engine compartment 11.

The bracket assembly 22 also includes a second plate 34, which is essentially an inverted, and somewhat narrower tray similar to the first plate 23. The second plate 34 includes short sidewalls 35. The first and second plates 23 and 34 are pivotably attached to each other by two bolts 42 extending through their respective sidewalls. The first plate 23 thus acts as a stationary mount for the second plate 34.

The bracket assembly 22 includes a bracket latch 43 which includes a fixed male latch member 44 attached to the underneath side of the second plate 34 via an angle member 45. A mating female latch member 46 is attached beneath the first plate 23. The female latch member 46 includes a spring loaded receiving hook 51 which extends beneath a aperture 52 formed in the first plate 23. The receiving hook 51 grasps the male latch member 44 when the second plate 34 is pivoted downward onto the first plate 23. A latch release handle 53 is also positioned beneath the first plate 23, with the release handle 53 being operable to move the receiving hook 51 away from engagement with the male latch member 44 to thereby release the bracket latch 43 and allow the second plate 34 to pivot upward relative to the first plate 23. A limiting strap 54 is provided to limit the extent to which the second plate 34 can pivot with respect to the first plate 23.

One half of each of a pair of hinges 55 are attached to a hinge mounting surface 41 on the second plate 34. Mating halves of the hinges 55 are attached beneath an upper rear edge 56 of the tractor hood 14 such that the hood 14 is pivotably connected to the hinge mounting surface 41 on the second plate 34. The hood 14 is conventionally shaped, and includes the elongate horizontal upper section 13 which is shaped as an inverted U in cross-section (FIG. 5) and which is oriented generally horizontally when the hood 14 is latched fully closed, as shown in FIG. 1. The horizontal upper section 13 is attached to the vertically oriented front section 21. A conventional front mounted hood latch 62 releasably attaches the front section 21 to the tractor frame 5. A pair of gas springs 63 are each pivotably attached at a lower end to respective brackets 65 within the engine compartment 11. An upper end of each of the gas springs 63 are pivotably attached to respective angle brackets 71 positioned beneath and approximately midway along the horizontal hood section 13. Each gas spring 63 includes a cylinder 72 containing a volume of compressible gas and a telescoping piston 73 which compresses the gas volume when it is forced into the cylinder 72. The compressed gas, in turn, tends to force the piston 73 outward, thus causing a spring effect.

OPERATION

FIG. 1 shows the tractor hood 14 in a down and latched condition substantially covering the engine compartment 11, the engine 12 and the associated engine accessories. For example, the engine 12 and an air filter canister 74 are illustrated schematically in FIG. 4. When an operator needs to gain access to the engine compartment 11, the hood latch 62 is released, and the gas springs 63 force the hood 14 to pivot upward about the hinges 55 to the tilted position illustrated in dotted lines in FIGS. 2 and 4, and in solid lines in FIG. 3. In the tilted position, the gas springs 63 are fully extended.

With the hood 14 in this tilted position, ready access is gained to most of the engine compartment 11 such that the engine 12 and most related components can be reached. However, as engine accessories proliferate in many modern tractors, the vertical profile of the engine and accessories is raised. Typically, accessories which only rarely require servicing might be placed in the upper, rear section of the engine compartment 11, and be blocked by the hood 14 even in the tilted position. For example, an air filter canister, such as the canister 74 in FIG. 4, may be serviced only once a year, for example. It might be placed as shown in FIG. 4 where it is not accessible with the hood tilted to the tilted position of FIG. 3 (solid lines). In prior art tractor hoods, when the air filter canister 74 needed servicing, the entire hood 14 would be removed in order to access it.

Figure 3:
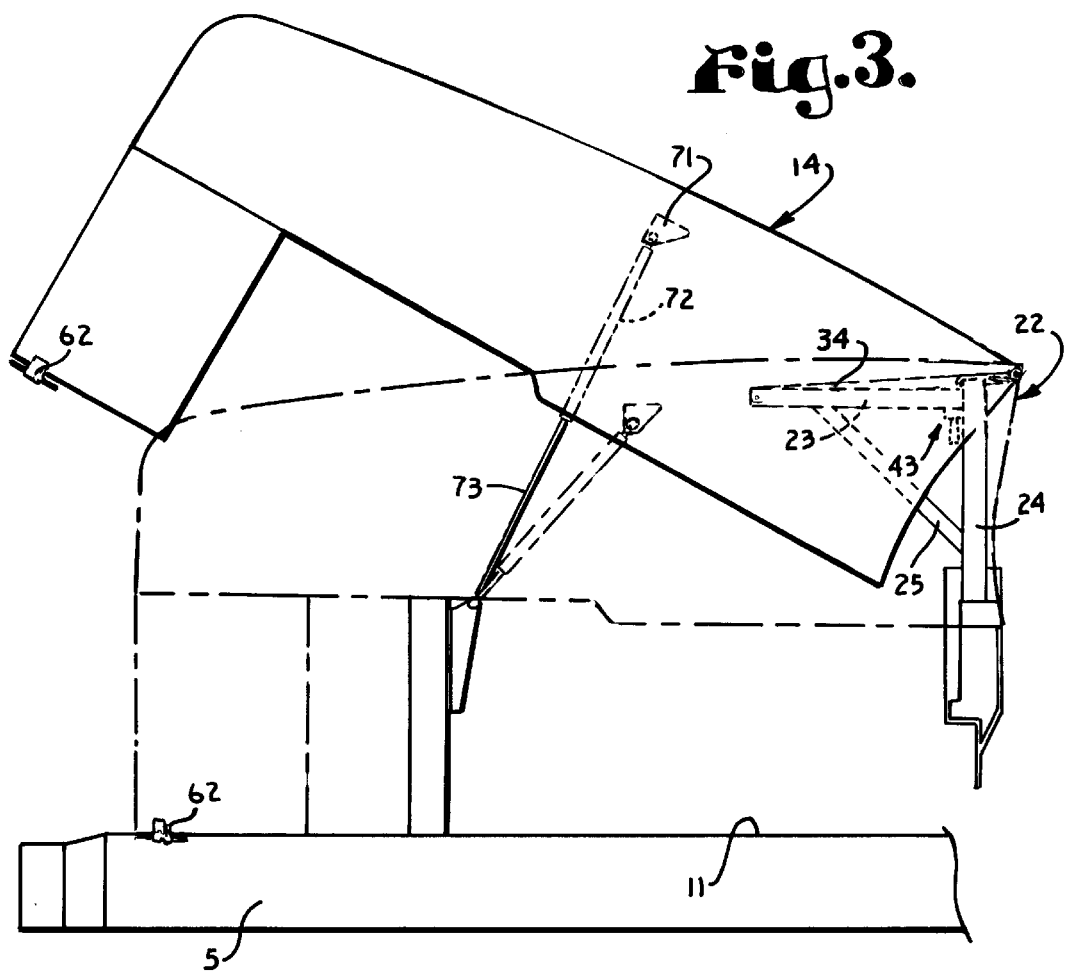
FIG. 3 is a greatly enlarged, partially schematic, fragmentary side elevational view of the tractor of FIG. 1, with the tractor hood now shown in broken lines in the closed position and in solid lines in the tilted position.
Figure 4:
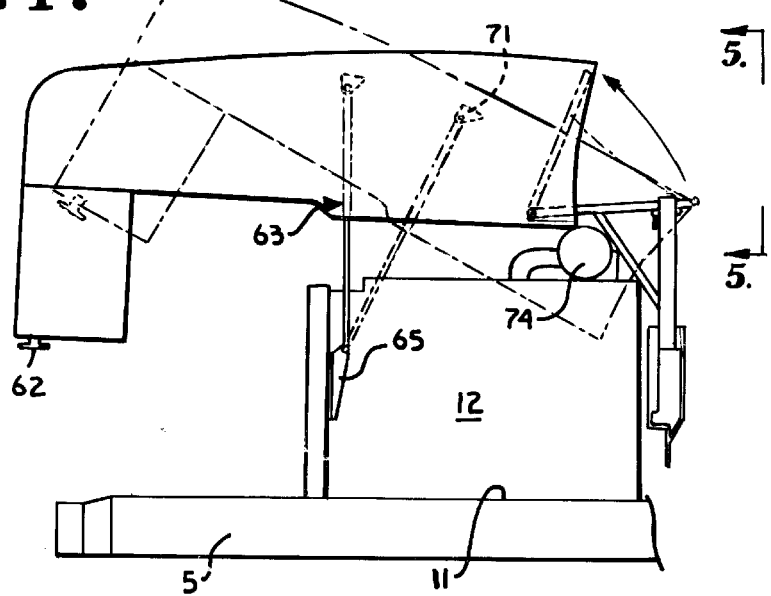
FIG. 4 is an enlarged, partially schematic, fragmentary side elevational view of the tractor of FIG. 1, with the tractor hood now shown in broken lines in the tilted position and in solid lines in an elevated, substantially horizontal position.
Figure 5:
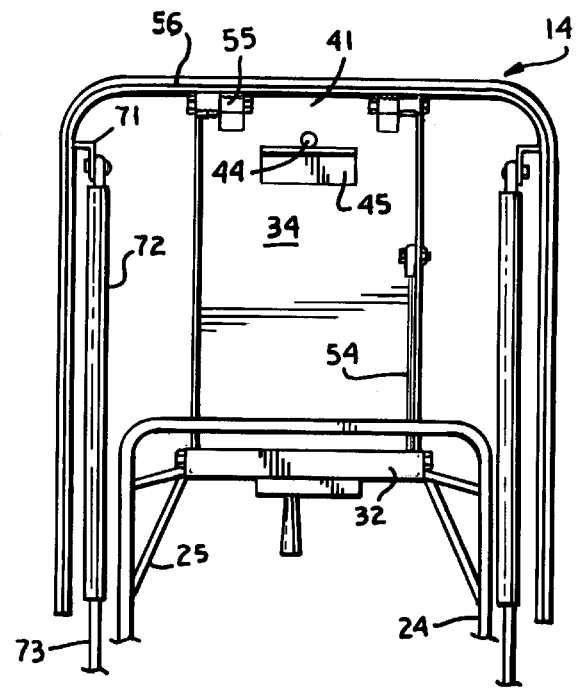
FIG. 5 is a greatly enlarged, fragmentary rear elevational view of the tractor hood and mounting bracket assembly, taken along line 5—5 of FIG. 4, with the movable bracket assembly plate and the attached tractor hood shown lifted to the elevated, substantially horizontal position.
Figure 6:
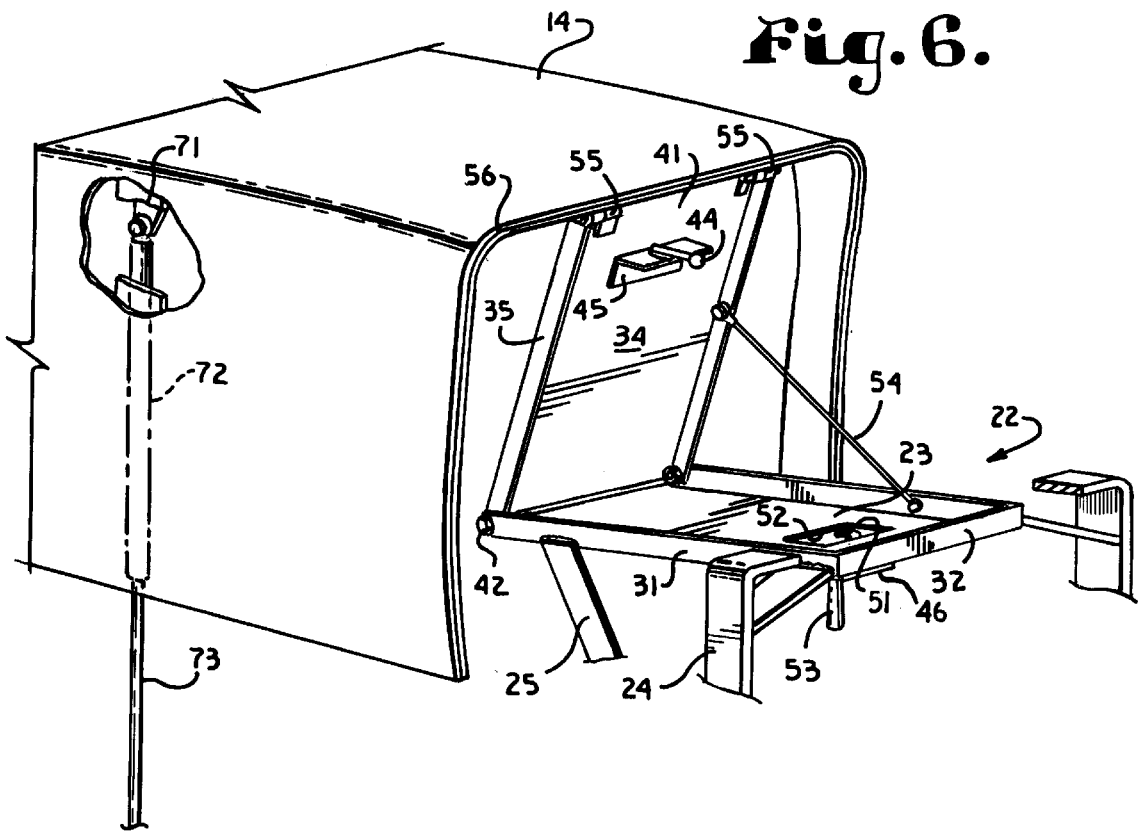
FIG. 6 is a greatly enlarged, fragmentary perspective view of the tractor hood and mounting bracket assembly, also with the movable bracket assembly plate and the attached tractor hood shown lifted to the elevated, substantially horizontal position.

With the present invention, however, in order to gain access to the air filter canister 74, once the hood 14 is in the tilted position of FIG. 3, the bracket latch release handle 53 is pulled, releasing the male latch member 44 from engagement with the spring loaded receiving hook 51. The second plate 34 is then free to pivot relative to the first plate 23 about the bolts 42. Thus, the release of the bracket latch 43, along with the relation of the center of gravity of the hood assembly to the bracket assembly 22 simultaneously raise and push forward the hinge mounting surface 41 of the second plate 34 along with the connected upper rear edge 56 of the hood 14, causing the hood 14 to move from the tilted position, as shown in FIG. 4, to the elevated, substantially horizontal position, as shown in solid lines in FIG. 4. The limiting strap 54 limits the extent to which the second plate 34 can pivot, thus preventing the hood 14 from rotating further forward about the gas springs 63.

As is clear in FIG. 4, the elevated, substantially horizontal hood position (solid lines) of FIG. 4 gives ready access to the air filter canister 74, which was blocked when the hood 14 was in the tilted position (broken lines).

In order to relatch the hood 14 from the raised position, the hood is grasped near the rear edge 55 thereof and pulled backward and downward until the male latch member 44 engages the spring loaded receiving hook 51 of the bracket latch 43. This latches the second plate 34 to the first plate 23 and thus the hood 14 into the tilted position. The front section 21 of the hood 14 is then pulled downward until the hood latch 62 is latched, thus latching the hood 14 in the closed and latched position of FIG. 1.

While the hood 14 has been illustrated as being hinged on the rear of the engine compartment 11, the same advantages could be realized by reversing the mounting bracket assembly 22 and placing it at the top front of the engine compartment 11, thus hinging the hood 14 to tilt forward instead of backward. In addition, while gas springs 63 have been illustrated, alternatives, such as coil springs, can be used to cause the hood 14 to move toward the tilted and elevated positions. The specific type of latch shown for the bracket latch 43 is merely illustrative, and many other types of latch mechanisms can be used equally effectively.

It is thus to be understood that while certain forms of the present invention have been illustrated and described herein, it is not to be limited to the specific forms or arrangement of parts described and shown.

What is claimed and desired to be secured by Letters Patent is as follows:

1. A double pivoting tractor hood assembly including a tractor hood selectively movable between a closed position in which the tractor hood at least partly covers an engine compartment of a tractor, a tilted position, and an elevated position, and comprising:

a. a first hood latch which selectively latches said hood into said closed position;
   b. a mounting bracket assembly positionable within said engine compartment, said mounting bracket assembly including a hinge mounting surface, said hinge mounting surface being selectively movable between a lowered position proximate one upper end of said engine compartment and an elevated position which is substantially higher than said lowered position;
   c. a hinge for pivotably connecting said hood to said hinge mounting surface; and
   d. a second hood latch which releasably latches said hinge mounting surface in said lowered position.

2. A double pivoting tractor hood assembly as in claim 1, wherein said mounting bracket assembly comprises:

a. a first plate which is stationary; and
   b. a second plate which is connected to said first plate and including said hinge mounting surface, said second plate being pivotable relative to said first plate to thereby move said hinge mounting surface between said lowered and said elevated positions.

3. A double pivoting tractor hood assembly as in claim 2, wherein said second hood latch comprises:

a. a bracket latch which releasably latches said second plate in said lowered position.

4. A double pivoting tractor hood assembly as in claim 1, and further comprising:

a. a spring which biases said hood toward said tilted position from said closed position.

5. A double pivoting tractor hood assembly as in claim 4, wherein:

a. said hood is also biased to move from said tilted position toward said elevated position.

6. A double pivoting tractor hood assembly as in claim 4, wherein said spring comprises at least one gas spring.

7. A double pivoting tractor hood assembly including a tractor hood selectively movable between a closed position in which the tractor hood at least partly covers an engine compartment of a tractor, a tilted position, and an elevated position, and comprising:

a. a hood latch for selectively latching said hood into said closed position;
   b. a mounting bracket assembly positionable within said engine compartment, said mounting bracket assembly including:
      i. a stationary mount positioned within said engine compartment;
      ii. a movable plate which is connected to said stationary mount and including a hinge mounting surface, said movable plate being pivotable relative to said stationary mount to thereby move said hinge mounting surface between a lowered and an elevated position; and
      iii. a bracket latch for releasably latching said movable plate in said lowered position; and
   c. a hinge for pivotably connecting said hood to said hinge mounting surface.

8. A double pivoting tractor hood assembly as in claim 7, and further comprising:

a. spring means for biasing said hood toward said tilted position from said closed position.

9. A double pivoting tractor hood assembly as in claim 8, wherein:

a. said hood is biased to move from said tilted position toward said elevated position.

10. A double pivoting tractor hood assembly as in claim 8, wherein said spring means comprises at least one gas spring.

11. A mounting bracket assembly for attaching a tractor hood to a tractor such that it is selectively movable between a closed position in which it at least partly covers an engine compartment of the tractor, a tilted position, and an elevated position, said mounting bracket assembly comprising:

a. a stationary mount positionable within said engine compartment;

b. a movable plate which is connected to said stationary mount, said movable plate being pivotable relative to said stationary mount;

c. said movable plate including a hinge mounting surface near one end thereof, said movable plate being selectively movable between a lowered position in which said one end is positioned proximate one upper end of said engine compartment and an elevated position in which said one end of said movable plate is substantially higher than said lowered position to thereby raise and lower, respectively, said hinge mounting surface;

d. a hinge attached to said hinge mounting surface for hingedly connecting said hood to said hinge mounting surface; and e. a bracket latch for releasably latching said movable plate in said lowered position.

12. A double pivoting tractor hood assembly as in claim 11, and further comprising:

a. a spring which biases said hood toward said tilted position from said closed position.

13. A double pivoting tractor hood assembly as in claim 12, wherein:

a. said hood is also biased to move from said tilted position toward said elevated position.

14. A double pivoting tractor hood assembly as in claim 12, wherein said spring comprises at least one gas spring.

\* \* \* \* \*